(12) United States Patent
Jaldén et al.

(10) Patent No.: US 10,555,184 B2
(45) Date of Patent: Feb. 4, 2020

(54) CELL SHAPING IN WIRELESS COMMUNICATIONS NETWORKS

(71) Applicant: TELEFONAKTIEBOLAGET LM ERICSSON (PUBL), Stockholm (SE)

(72) Inventors: Niklas Jaldén, Enköping (SE); Henrik Asplund, Stockholm (SE); David Astely, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/516,082

(22) PCT Filed: Oct. 6, 2014

(86) PCT No.: PCT/EP2014/071366
§ 371 (c)(1),
(2) Date: Mar. 31, 2017

(87) PCT Pub. No.: WO2016/055092
PCT Pub. Date: Apr. 14, 2016

(65) Prior Publication Data
US 2017/0311180 A1 Oct. 26, 2017

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0617* (2013.01); *H04L 5/0048* (2013.01);
(Continued)

(58) Field of Classification Search
CPC ..... H04W 16/28; H04W 16/18; H04W 24/10; H04W 92/20; H04B 7/0617; H04L 5/0048
(Continued)

(56) References Cited

U.S. PATENT DOCUMENTS 7,065,361 B1 * 6/2006 Fortuna ................. H04W 24/02
455/436
8,644,207 B1 * 2/2014 Vivanco ................. H04W 4/06
370/232

(Continued)

OTHER PUBLICATIONS

International Search Report and Written Opinion dated Jun. 11, 2015, issued in Application No. PCT/EP2014/071366, 9 pages.

(Continued)

*Primary Examiner* — Shahriar Behnamian
(74) *Attorney, Agent, or Firm* — Rothwell, Figg, Ernst & Manbeck, P.C.

(57) ABSTRACT

There is provided a method for shaping cells in a wireless communications network. The method is performed by a network node. The method comprises acquiring previously stored spatial channel characteristics for wireless devices (WDs), the WDs being associated with a set of radio access network nodes (RANNs), the of the WDs being measured between the at least one WD and at least two RANNs in the set of RANNs. The method comprises determining beam forming parameters for shaping cells for at least one RANN in the set of RANNs based on the acquired spatial channel characteristics such that at least a predetermined share of the WDs has a network coverage probability being higher than a predetermined threshold value. The method comprises notifying at least one of the RANNs in the set of RANNs of the determined beam forming parameters.

21 Claims, 4 Drawing Sheets

(51) Int. Cl.
*H04L 5/00* (2006.01)
*H04W 24/10* (2009.01)
*H04W 16/18* (2009.01)
*H04W 92/20* (2009.01)

(52) U.S. Cl.
CPC ............ *H04W 24/10* (2013.01); *H04W 16/18* (2013.01); *H04W 92/20* (2013.01)

(58) Field of Classification Search
USPC ........................................................ 455/446
See application file for complete search history.

(56) References Cited

U.S. PATENT DOCUMENTS

| | | | | |
|---|---|---|---|---|
| 2006/0111149 A1* | 5/2006 | Chitrapu | ................ | H01Q 1/246 455/562.1 |
| 2006/0194617 A1* | 8/2006 | Scherzer | ............... | H04W 16/00 455/562.1 |
| 2013/0090126 A1* | 4/2013 | Xing | .................... | H04B 7/0617 455/452.1 |
| 2013/0176979 A1* | 7/2013 | Ohwatari | ............ | H04W 72/046 370/329 |
| 2015/0131538 A1* | 5/2015 | Ben-Nun | .......... | H04W 72/1231 370/329 |

OTHER PUBLICATIONS

European Office Action issued in Application No. 14 780 887.7 dated May 22, 2018, 6 pages.

* cited by examiner

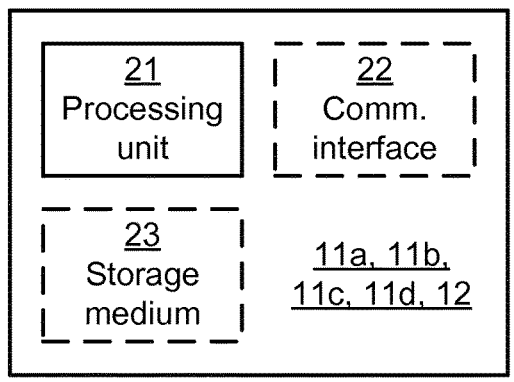
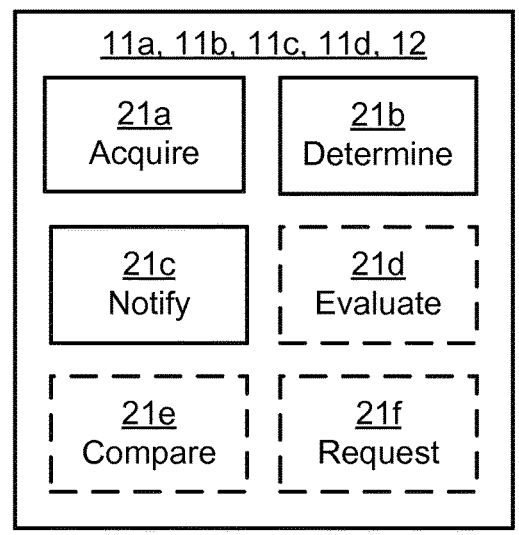
Fig. 2a
Fig. 2b
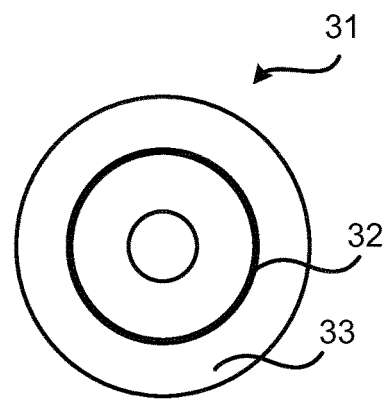
Fig. 3

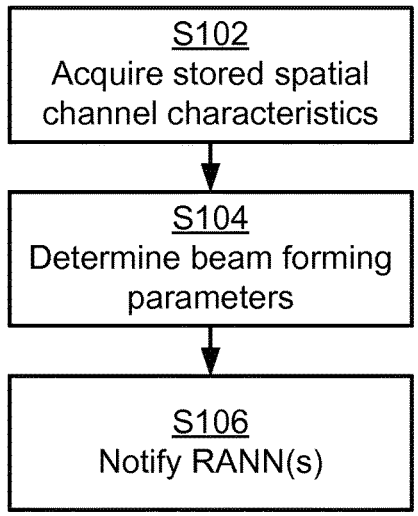
Fig. 4
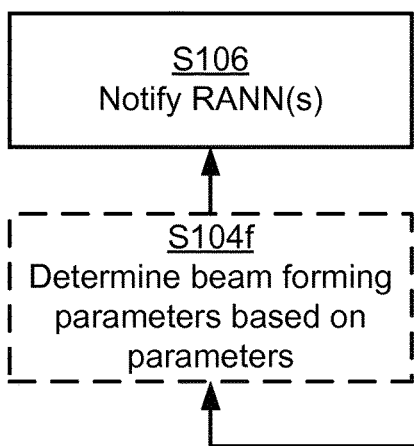
Fig. 5
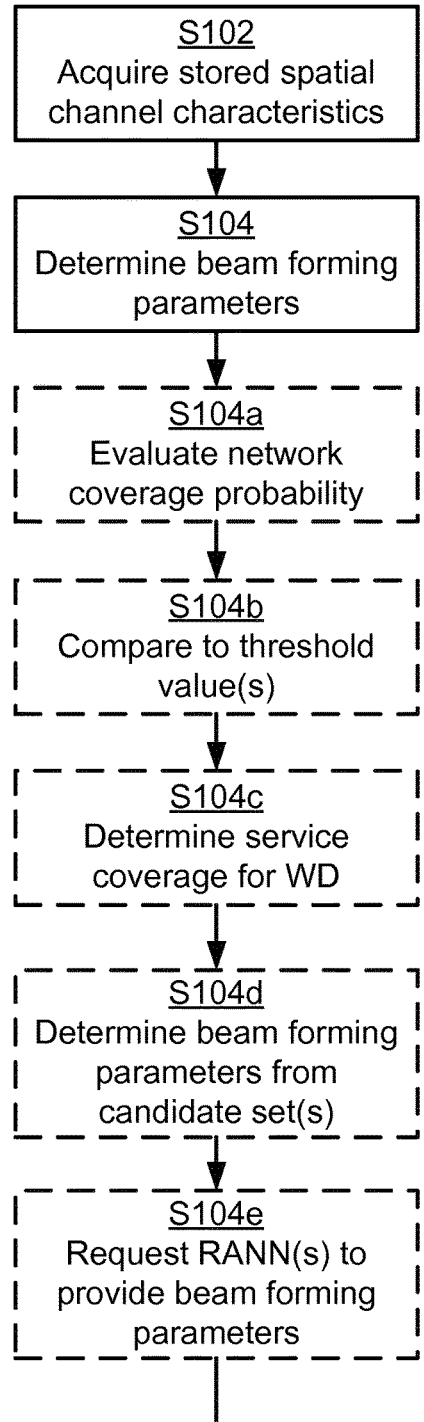

CELL SHAPING IN WIRELESS COMMUNICATIONS NETWORKS

CROSS REFERENCE TO RELATED APPLICATION(S)

This application is a 35 U.S.C. § 371 National Stage of International Patent Application No. PCT/EP2014/071366, filed Oct. 6, 2014, designating the United States, the disclosure of which is incorporated by reference.

TECHNICAL FIELD

Embodiments presented herein relate to cell shaping in wireless communications networks, and particularly to methods, a network node, a computer program, and a computer program product for shaping cells in a wireless communications network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the antenna systems used by the radio access network (RAN) nodes in the communications network and/or the wireless devices (WDs) with which the RAN nodes communicate so as to provide network coverage for the WDs.

Advanced antenna systems may be used to significantly enhance performance of wireless communication systems in both uplink (UL, i.e., from WD to RAN node) and downlink (DL, i.e., from RAN node to WD). In the downlink, there are three basic approaches for utilizing the antenna: diversity, multiplexing and beam forming.

With beam forming, the radiation pattern of the antenna may be controlled by transmitting a signal from a plurality of elements with an element specific gain and phase. In this way, radiation patterns with different pointing directions and transmission and/or reception beam widths in both elevation and azimuth directions may be created.

With so called WD specific beam forming, (narrower) beams may be formed to specific WDs in order to increase the receive signal power in these specific WDs while at the same time controlling interference generated to other WDs receiving data transmission.

WD specific beam forming is not the only form of beam forming. In mobile broadband systems based e.g., on High Speed Packet Access (HSPA) and Long Term Evolution (LTE), a common reference signal is transmitted (e.g., on a Common Pilot Channel (CPICH) or as cell specific reference signals (CRS)). Such signals may be used by WDs both for measurements to select a RAN node to communicate with, as well as a demodulation reference signal for data to be received by both single and multiple WDs served by one RAN node. Often, the area where a specific cell specific reference signal is received with highest power (as compared to cell specific reference signals transmitted from other RAN nodes) is referred to as a cell, and beam forming of the cell specific reference signal may therefore be referred to as "cell shaping".

One form of cell shaping used in existing cellular communications networks is electrical and mechanical down tilt, where coverage of the cell and interference between multiple cells can be adjusted by changing the elevation angle of the radiated beam (i.e., by changing the pointing direction of the antenna at the RAN node). Commonly used sector antennas employ a form of cell specific beam forming. More specifically, an array of vertically stacked antenna element connected with a passive feeder network may be used, and the feeder network may hence implement the beam forming at radio frequencies. In such cases, individual antenna elements, or groups of antenna elements are not visible at base band. However, in future advanced antenna systems, it is envisioned that elements or groups of elements will be controlled, and also observable, at baseband.

There exist a few automatic mechanisms that change the tilt setting based on some network measurements in order to adaptively change the antenna system to current network conditions. Existing mechanisms are designed for commonly used sector antennas of today where individual elements or groups of elements are not observable at baseband and do hence not exploit the full potential benefits of advanced antenna systems.

In addition to tilt, which is the pointing direction in elevation, the elevation beam width can also be adjusted. It may for example be increased for a smaller cell in a dense high rise area where the positions of WDs in the cell are dispersed within a wide range of elevation angles. Similarly, the horizontal pointing direction and beam width in azimuth may be changed to better match the distribution of traffic.

One potential issue with changing the radiation pattern is to ensure that coverage holes are not created. For example, it may be desirable to tilt down the antennas in several cells to reduce the interference between cells, but at the same time, there is a risk that coverage is lost, either in the sense that no cell specific signal is received at the some locations, with sufficient signal power, or that too many signals are received, so the signal to interference ratio becomes too low. This is a potential issue for reception of basic common signals that must be received by all WDs to be able to connect to the communications network, as well as reception of data with a certain minimum rate.

An existing solution is to try different settings, observe the communications network performance and keep the setting that gives the best performance. However, since WDs cannot be served in coverage holes, the poor performance for these WDs cannot be observed by the communications network. Current automatic tilt solutions try to mitigate this issue by changing the tilt in small steps, to avoid coverage holes. This however still does not a guarantee that coverage is maintained and it makes the adaptation slow.

Furthermore, there is also an inherent conflict when it comes to the period during which measurements are made. On one hand, it is desirable to measure for only short periods to enable decently rapid adaptation to perhaps even match fluctuations in the traffic, but on the other hand one would like to measure over somewhat longer time to capture performance that is relevant for all user position distributions.

Hence, there is still a need for an improved cell shaping in wireless communications networks.

SUMMARY

An object of embodiments herein is to provide efficient cell shaping in wireless communications networks.

According to a first aspect there is presented a method for shaping cells in a wireless communications network. The method is performed by a network node. The method comprises acquiring previously stored spatial channel characteristics for wireless devices (WDs), the WDs being associated with a set of radio access network nodes (RANNs), the spatial channel characteristics for at least one WD of the WDs being measured between the at least one WD and at least two RANNs in the set of RANNs. The method comprises determining beam forming parameters for shaping cells for at least one RANN in the set of RANNs based on the acquired spatial channel characteristics such that at least a predetermined share of the WDs has a network coverage probability being higher than a predetermined threshold value. The method comprises notifying at least one of the RANNs in the set of RANNs of the determined beam forming parameters.

Advantageously this provides efficient cell shaping in wireless communications networks.

Advantageously this allows network coverage to be evaluated before cell shapes are changed in the actual communications network, meaning that it can be ensured that the network coverage is not significantly degraded due to cell shaping. Advantageously this means that network coverage holes can be avoided since they can be observed before they are created.

Advantageously this allows sensitivity to variations in the traffic distribution to be reduced since measurements also from the past are used.

Advantageously, avoiding coverage holes for proposed cell shapes before network evaluation can enable larger changes of cell shapes in each step, and thus facilitate more rapid tuning of the communications network.

According to a second aspect there is presented a network node for shaping cells in a wireless communications network. The network node comprises a processing unit. The processing unit is configured to acquire previously stored spatial channel characteristics for WDs, the WDs being associated with a set of RANNs, the spatial channel characteristics for at least one WD of the WDs being measured between the at least one WD and at least two RANNs in the set of RANNs. The processing unit is configured to determine beam forming parameters for shaping cells for at least one RANN in the set of RANNs based on the acquired spatial channel characteristics such that at least a predetermined share of the WDs has a network coverage probability being higher than a predetermined threshold value. The processing unit is configured to notify at least one of the RANNs in the set of RANNs of the determined beam forming parameters.

According to a third aspect there is presented a computer program for shaping cells in a wireless communications network, the computer program comprising computer program code which, when run on a processing unit of a network node, causes the processing unit to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 2a is a schematic diagram showing functional units of a network node according to an embodiment;

FIG. 2b is a schematic diagram showing functional modules of a network node according to an embodiment;

FIG. 3 shows one example of a computer program product comprising computer readable means according to an embodiment; and FIGS. 4, 5, 6, and 7 are flowcharts of methods according to embodiments.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
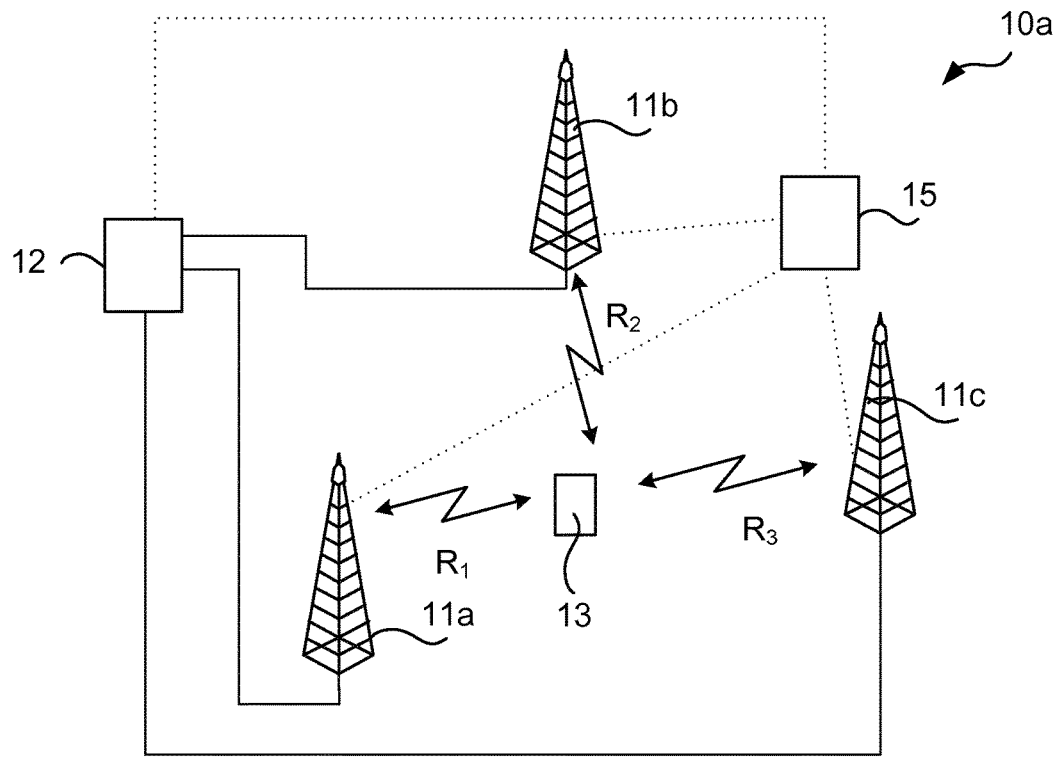
FIGS. 1a and 1b are schematic diagrams illustrating communications networks according to embodiments.

FIG. 1a is a schematic diagram illustrating a communications network 10a where embodiments presented herein can be applied. The communications network 10a comprises radio access network nodes, RANNs 11a, 11b 11c. The RANNs 11a, 11b 11c may be any combination of radio base stations such as base transceiver stations, node Bs, and/or evolved node Bs. The RANNs 11a, 11b 11c may further be any combination of macro RANNs, and micro, or pico, RANNs. Each RANN 11a, 11b, 11c provides network coverage in a respective coverage region (see, FIG. 1b) by transmitting transmission beams R1, R2, R3 in that coverage region. Each such coverage region forms a cell. Hence, the wireless communications network 10a, may regarded as a cellular wireless communications network. Each RANN 11a, 11b 11c is assumed to be operatively connected to a core network, as exemplified by one central network node 15. In some embodiments the central network node 15 is radio network controller (RNC). The core network may in turn be operatively connected to a service and data providing wide area network. The RANNs 11a, 11b 11c may further be operatively connected to a network node 12. The network node 12, which may be a centralized network node, will be further disclosed below.

Hence, a wireless device 13 served by one of the RANNs 11a, 11b, 11b may thereby access services and data as provided by the wide area network. The wireless devices 13 may be any combination of mobile stations, mobile phones, handsets, wireless local loop phones, user equipment (UE), smartphones, laptop computers, and/or tablet computers.

Figure 1B:
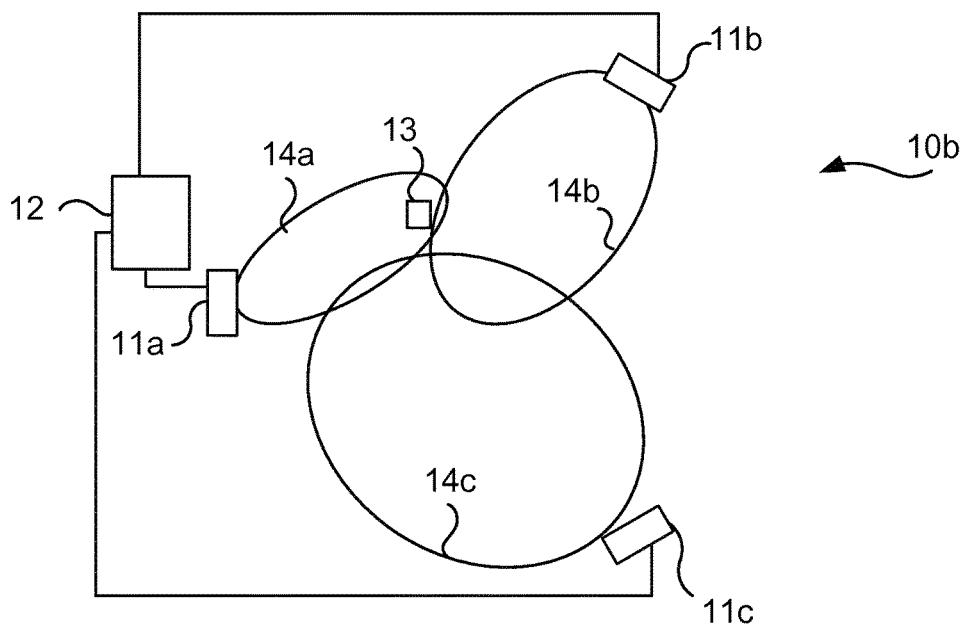

FIG. 1b is another schematic diagram illustrating a communications network 10b where embodiments presented herein can be applied. The communications network 10b of FIG. 1b is similar to the communications network boa of FIG. 1a but differs that the central network node 15 is not illustrated. Further, in the illustrative example of FIG. 1b the coverage regions, or cells 14a, 14b, 14c of each RANN 11a, 11b, 11c have been schematically illustrated. Each cell 14a, 14b, 14c can be shaped by applying beam forming parameters at the RANNs 11a, 11b, 11c.

As noted above, by applying such beam forming, the radiation pattern of the antenna at a RANN 11a, 11b, 11c may be controlled by transmitting a signal from a plurality of elements with an element specific gain and phase. In this way, radiation patterns with different pointing directions and transmission and/or reception beam widths in both elevation and azimuth directions may be created.

As also noted above, there is still a need for an improved cell shaping in wireless communications networks 10a, 10b. There are several ways in which candidate cell shaping weights can be determined. One way is to try different beam forming weights, for example corresponding to an increase or decrease of the current tilt in one or several cells. Then, the network performance may be observed and settings that are good may be kept. The procedure may then be repeated for the kept settings. As mentioned above, one issue with this approach is that when the weights are changed, undesired coverage holes may be created, and the length of the measurement period to get reliable statistics is uncertain.

As will be further disclosed below, at least some of the herein disclosed embodiments are based on collecting and saving spatial channel characteristics from WDs 13. Such previously stored spatial channel characteristics may then be used to assess coverage for different cell shapes before the performance of them is evaluated. The performance may be based not only for WDs 13 currently in the communications network 10a, 10b but also for WDs 13 that have previously been connected to the communications network 10a, 10b.

The embodiments disclosed herein relate to cell shaping in wireless communications networks 10a, 10b. In order to obtain such cell shaping there is provided a network node, methods performed by the network node, a computer program comprising code, for example in the form of a computer program product, that when run on a processing unit of a network node, causes the processing unit to perform the method.

FIG. 2a schematically illustrates, in terms of a number of functional units, the components of a network node 11a, 11b, 11c, 12 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31a (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The network node 11a, 11b, 11c, 12 may further comprise a communications interface 22 for communications with any combination of at least one other network node 11a, 11b, 11c, 12, at least one central network node 15, and at least one WD 13. As such the communications interface 22 may comprise one or more transmitters and receivers, comprising analogue and digital components and a suitable number of antennas for radio communications and ports for wired communications. The processing unit 21 controls the general operation of the network node 11a, 11b, 11c, 12 e.g. by sending data and control signals to the communications interface 22 and the storage medium 23, by receiving data and reports from the communications interface 22, and by retrieving data and instructions from the storage medium 23. Other components, as well as the related functionality, of the network node 11a, 11b, 11c, 12 are omitted in order not to obscure the concepts presented herein.

FIG. 2b schematically illustrates, in terms of a number of functional modules, the components of a network node 11a, 11b, 11c, 12 according to an embodiment. The network node 11a, 11b, 11c, 12 of FIG. 2b comprises a number of functional modules; an acquire module 21a configured to perform below disclosed step S102, a determine module 21b configured to perform any of below disclosed steps S104, S104c, S104d and S104f, and a notify module 21c configured to perform below disclosed step S106. The network node 11a, 11b, 11c, 12 of FIG. 2b may further comprises a number of optional functional modules, such as any of an evaluate module 21d configured to perform below disclosed step S104a, a compare module 21e configured to perform below disclosed step S104b, and a request module 21f configured to perform below disclosed step S104e. The functionality of each functional module 21a-f will be further disclosed below in the context of which the functional modules 21a-f may be used. In general terms, each functional module 21a-f may be implemented in hardware or in software. Preferably, one or more or all functional modules 21a-f may be implemented by the processing unit 21, possibly in cooperation with functional units 22 and/or 23. The processing unit 21 may thus be arranged to from the storage medium 23 fetch instructions as provided by a functional module 21a-f and to execute these instructions, thereby performing any steps as will be disclosed hereinafter.

The network node 11a, 11b, 11c, 12 may be provided as a standalone device or as a part of a further device. For example, the network node 11a, 11b, 11c, 12 may be provided in a radio access network node or a central controller node. The network node 11a, 11b, 11c, 12 may be provided as an integral part of the radio access network node or a central controller node. That is, the components of the network node 11a, 11b, 11c, 12 may be integrated with other components of the radio access network node or a central controller node; some components of the radio access network node or a central controller node and the network node 11a, 11b, 11c, 12 may be shared. For example, if the radio access network node or a central controller node as such comprises a processing unit, this processing unit may be arranged to perform the actions of the processing unit 21 of with the network node 11a, 11b, 11c, 12. Alternatively the network node 11a, 11b, 11c, 12 may be provided as a separate unit in the radio access network node or a central controller node.

FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

FIGS. 4, 5, 6, and 7 are flow chart illustrating embodiments of methods related to cell shaping in wireless communications networks 10a, 10b. The methods are performed by the network node 11a, 11b, 11c, 12. The methods are advantageously provided as computer programs 32.

Reference is now made to FIG. 4 illustrating a method for cell shaping in wireless communications networks 10a, 10b as performed by the network node 11a, 12 according to an embodiment.

The network node 11a, 12 is configured to, in a step S102, acquire previously stored spatial channel characteristics for wireless devices (WDs) 13. The WDs 13 are associated with a set of radio access network nodes (RANNs) 11a, 11b, 11c. The spatial channel characteristics for at least one WD 13 of the WDs have been measured between the WDs 13 and at least two RANNs in the set of RANNs 11a, 11b, 11c. The spatial channel characteristics for the remaining WDs of the WDs may have been measured between these remaining WDs and a respective at least one RANN (i.e., one RANN, or two RANNs, or three RANNs, etc.) in the set of RANNs 11a, 11b, 11c. The spatial channel characteristics may have been measured by the WD 13 or some other entity than the WD 13, e.g. by a RANN 11a, 11b, 11c on the uplink. Further, it might be that some WDs 13 can only hear/be covered by a single RANN 11a, 11b, 11c. Thus, the previously stored measurements are to be interpreted as "samples" or "measurements" that are collected by WDs 13 or RANNs 11a, 11b, 11c and each measurement may be associated with a set of RANNs 11a, 11b, 11c. For example, a single WD 13 may collect multiple measurements or samples, where each measurement may be associated with a different set of RANNs 11a, 11b, 11c. The WDs 13 are mobile and hence may be used to collect multiple measurements at different points in time, likely corresponding to different locations.

The network node 11a, 12 is configured to, in a step S104, determine beam forming parameters for shaping cells 14a, 14b, 14c for at least one RANN in the set of RANNs 11a, 11b, 11c based on the acquired spatial channel characteristics such that at least a predetermined share of the WDs has a network coverage probability being higher than a predetermined threshold value. Cell shaping may thereby be performed in one cell 14a, 14b, 14c at a time using the joint coverage provided by multiple RANNs 11a, 11b, 11c, but not necessarily that multiple RANNs 11a, 11b, 11c need to be beam formed. Though changing the beam forming in one cell 14a, 14b, 14c may change the cell shapes also in the neighbour cells 14a, 14b, 14c.

In general terms, cell shapes are assumed to be realized by means of beam forming which means that each cell 14a, 14b, 14c has a set of beam forming weights. In some embodiments with an advanced antenna system, the beam forming weights are applied on the elements or groups of elements available at baseband and the channel characteristics refers to the channels of these available elements.

The network node 11a, 12 is configured to, in a step S106, notify at least one of the RANNs in the set of RANNs 11a, 11b, 11c of the determined beam forming parameters.

Hence, spatial channel characteristics between WDs and several RANNs may be determined and stored in a centralized or distributed fashion. A database storing such spatial channel characteristics may thus comprise spatial channel characteristics not only for positions were WDs currently in the communications network are located but also for positions where WDs connected to the communications network have been located in the past. When a cell shape is to be changed in one or several cells, the network node 11a, 11b, 11c, 12 may evaluate the coverage probability using the database and the intended cell shape. In such a way coverage may be guaranteed in all locations where there has been coverage in the past.

Embodiments relating to further details of cell shaping in wireless communications networks 10a, 10b will now be disclosed.

In some embodiment, the spatial channel characteristics comprises channel correlation matrices determined from UL measurements scaled with path gain obtained from terminal reference signal received power (RSRP) measurements, and the cell shapes are represented by weight vectors comprising the amplitude and phase excitations of the common signal to be transmitted from the plurality of antenna elements. The network node 11a, 11b, 11c, 12 may then evaluate the received signal power for the cell shapes to confirm that coverage is not lost. Particular details of such embodiments as well as further embodiments will now be disclosed in detail.

Each one of the spatial channel characteristics may comprise a spatial relation between at least one of the WDs 13 and at least one of the RANNs 11a, 11b, 11c. The information given by the spatial relation can thus be used to describe from what position/location of the WD 13 (in relation to at least one of the RANNs 11a, 11b, 11c) the spatial channel characteristics were measured.

The beam forming parameters may be provided as beam forming weight vectors.

Historical measurements may guarantee network coverage of historical WD locations. Hence, the spatial channel characteristics may be spatial channel characteristics of at least some WDs 13 no longer served by any of the RANNs 11a, 11b, 11c when the spatial channel characteristics are acquired by the network node 11a, 12. However, the methods disclosed herein works with only current locations as well. Thus channel characteristics need not to be old/historical data.

There may be different ways of providing the notifying in step S106. For example, the notifying may be based on X2 interface signalling.

There may be different ways of how the RANNs in the set of RANNs are related. For example, the set of RANNs 11a, 11b, 11c may corresponds to all RANNs of one central network node 15, such as one radio network controller, RNC.

Reference is now made to FIG. 5 illustrating methods for cell shaping in wireless communications networks 10a, 10b as performed by the network node 11a, 11b, 11c, 12 according to further embodiments.

According to at least some of the herein disclosed embodiments, before the cell shapes are adjusted in the actual wireless communications network 10a, 10b, a database comprising previously stored spatial channel characteristics for WDs 13 may be used to evaluate the coverage for the new proposed set of cell shaping weights, as defined by the determined beam forming parameters. More specifically, such a database may comprise a large number of samples, and each sample may comprise spatial channel characteristics to a set of RANNs 11a, 11b, 11c (or at least one RANN 11a, 11b, 11c). Hence, the beam forming parameters may be determined without network deployment. Thus, the network node 11a, 12 may be configured to, in an optional step S104a, determine the beam forming parameters by evaluating the network coverage probability if the determined beam forming parameters would have been used, without deploying the determined beam forming parameters (in the actual wireless communications network 10a, 10b).

With knowledge of the spatial channel characteristic and the cell shapes currently applied in the RANNs 11a, 11b, 11c, an estimate of the received signal power to the RANNs 11a, 11b, 11c associated with this measurement point can be formed. By comparing the highest received power with a minimum requirement of received signal power, it may be established whether or not the sample point has sufficient network coverage. By using all (or a subset of) the measured points in the database, an estimate of the network coverage probability can be obtained. An estimate of a signal to interference (and noise) ratio may be formed to further assess the network coverage. Hence, the network node 11a, 12 may be configured to, in an optional step S104b, determine the service coverage by comparing received power, estimated signal to noise ratio, estimated signal to interference and noise ratio, and/or estimated bit rate to appropriate threshold values.

Further, the beam forming parameters may be determined based on network coverage probabilities. If the coverage is deemed to be sufficient, e.g. 95% or 99% percent of evaluated points have sufficient network coverage, the set of weights can be applied so as to change the cell shape. Particularly, the predetermined threshold value may corresponds to at least 90% of the WDs in the predetermined share of the WDs 13 have network coverage from at least one of the at least two RANNs 11a, 11b, 11c. If network coverage is determined not to be sufficient, the network node 11a, 12 may choose not to apply the candidate cell shapes and thereby avoid creating a coverage hole.

In some embodiments, the database may be used to determine candidate cell shapes to be evaluated at the different cells. Being able to estimate the performance for all samples, the network node 11a, 12 may evaluate what systems settings that would improve performance for example for the cell edge users. It may further be possible to estimate the network performance given some system model. Particularly, the network node 11a, 12 may be configured to, in an optional step S104c, determine to the service coverage for at least one WD 13 for at least two candidate sets of beam forming parameters. The network node 11a, 12 may then further be configured to, in an optional step S104d, determine the beam forming parameters as the candidate set of beam forming parameters having best service coverage. One of the at least two candidate sets of beam forming parameters may correspond to a set of currently used beam forming parameters and at least one of the at least two candidate sets of beam forming parameters may correspond to a proposed updated set of beam forming parameters.

There may be different ways of measuring the network coverage. For example, the network coverage may relate to coverage of a specific service channel and/or a specific control channel for a WD 13. Hence, if a WD 13 is able to receive a specific service channel and/or a specific control channel it may be defined as being within network coverage.

Also currently used beam forming parameters may be used to determine (updated) beam forming parameters. Hence, the network node 11a, 12 may be configured to, in an optional step S104e, request at least one of the RANNs 11a, 11b, 11c to provide its currently used beam forming parameters. The network node 11a, 12 may then be configured to, in an optional step S104f, determine the beam forming parameters based on the currently used beam forming parameters.

There may be different examples of spatial channel characteristics and different ways to collect the spatial channel characteristics. In general terms, the term spatial channel characteristic may denote a measurement or estimate of how the signal strength and phase of a link varies as a function of element (or group of elements) position within an antenna array. Some examples will now be disclosed. The spatial channel characteristics may represent direct channel estimates corresponding to the radio channel between each element or groups of elements and the WD, represented by a vector h. The spatial channel characteristics may be provided by means of a correlation/covariance matrix, $R=E\{h^H*h\}$. The spatial channel characteristics may represent direction of arrival/departure estimates, typically estimated from h or R using various model-based or sub-space-based methods as known in the literature. The spatial channel characteristics may represent signal strength estimates for a set of different excitations vectors $w_1, \ldots, w_N$, e.g. the estimate $s_j=w_j*h\}$ or the magnitude/power of this estimate. Hence, in summary, the spatial channel characteristics may relate to at least one of a pointing direction for radio waves transmitted or received by the RANNs, channel correlation or covariance matrices determined from uplink measurements, and signal strength estimates over multiple antenna elements or beam forms. Further, the spatial channel characteristics may represent measurements of sounding reference signals (SRS), and/or channel state information reference signals (CSI-RS), or be provided as reference signal received power (RSRP) reports (see, below).

In the uplink of LTE, a WD 13 may be configured to send a known signal for channel sounding purposes, a so called sounding reference signal (SRS). A RANN 11a, 11b, 11c that is aware of an SRS transmission may be enabled to use the known signal to perform a spatial channel estimate.

In some embodiments, the serving RANN 11a for a specific WD 13 exchanges the SRS allocations of one or more of its served WDs 13 with its neighbor RANN(s) 12b, 12c, enabling all such RANN(s) 11b, 11c to individually form spatial channel estimates of their links towards each such WD 13. In such particular embodiments, each RANN 11a, 11b, 11c may form a covariance matrix estimate. However embodiments where other measures are used can also be considered within the scope of the herein disclosed embodiments. Further, the covariance matrix estimates may be transformed from the uplink frequency to the downlink frequency such that they better represent the spatial channel characteristics for the frequency on which beam forming will be applied.

A spatial characteristics report may be generated for each such spatial channel characteristics. Hence, the spatial channel characteristics may be provided in reports from each WD 13. The report may includes not only the spatial channel characteristics itself but also the identity of the measuring cell, an indicator of what cell shaping weights if any are included in the measure, and/or an identifier of the WD 13 for which the measurement was performed. Each report may thus further comprise a cell identity, a WD identity, and/or an indication of beam forming parameters for the spatial channel characteristics in the report. Each report may further comprise traffic prioritization information (disclosing e.g., if the corresponding data traffic is from an emergency call, or from users associated with public safety). Each report may further comprise a timestamp indicating a point in time when the report was generated.

Such reports may be sent for inclusion in the centralized or distributed database. These reports may first be aggregated on a per-WD basis, e.g. at the serving RANN 11a. All this information may thus be considered when determining beam forming parameters for shaping cells 14a, 14b, 14c as in step S106 above.

As noted above, WD RSRP measurements may additionally and/or alternatively be used, not only to determine the serving RANN 11a in general, but also to determine which are the neighbor RANN(s) 11b, 11c mentioned above. The RSRP measurements may be performed on cell specific reference signals and the measurements may therefore depend on the cell shaping weights used at the time of measurements. To be able to predict the received signal power for a different set of cell shaping weights, the measurements may need to be associated with the cell shaping weights used during the measurements.

In some embodiment, the WD 13 performs the measurements for several different cell shaping candidate weights, referred to as excitation weights above. In an LTE setting, feedback from the WD 13 may be used for coordinated multipoint (CoMP) using CSI-RS of several cells. In such settings, the WD 13 may report RSRP measurements for one or several candidate beam shapes of multiple cells directly to the serving RANN 11a.

A coverage prediction for a specific existing or historical RANN-to-WD link when considering a hypothetical candidate cell shape can be formed by considering the combined effect of the spatial channel characteristics and the hypothetical radiation pattern. The signal strength of a particular link in terms of the RSRP that the WD 13 will experience may be estimated as:

$$\widehat{RSRP} = \frac{RSRP_{WD} * w_{candidate}^H * R * w_{candidate}}{w_{meas}^H * R * w_{meas}}$$

Here, the term $\widehat{RSRP}$ thus is the estimated signal strength in terms of RSRP. Further, $RSRP_{WD}$ is the measured RSRP value, $w_{candidate}$ is the considered weight vector over the elements in the antenna array (thereby forming the radiation pattern/cell shape), R is the spatial correlation matrix, and $w_{meas}$ is the weight vector for which the RSRP value was measured.

Further, an estimate of the signal-to-noise ratio (SNR) may be formed by comparing the estimated RSRP to an estimated or a priori known noise power level, possibly with a scaling coefficient $\alpha$ to take into account differences in the respective measurement procedures:

SNR=$\alpha \cdot$RSRP/N.

Service coverage, given a certain weight vector, may be assessed by comparing the SNR with a predetermined threshold value. In case where RSRP and/or SNR estimates exist for multiple RANNs 11a, 11b in relation to a certain WD 13, the maximum SNR may be used to determine the service coverage.

Similarly, an estimate of the signal-to-interference and noise level (SINR) may be formed by comparing the maximum estimated RSRP for a particular WD 13 with the sum of the RSRPs for all links from other RANNs 11a, 11b to the same WD 13 as follows:

SINR=max(RSRP)/((sum(RSRP)−max(RSRP))+$\alpha \cdot$N), where max(RSRP) denotes the maximum RSRP value and where sum(RSRP) denotes the sum of all RSRP values. This measure may be referred to as the "geometry" and may be seen as the signal to interference ratio if all RANNs are simultaneously transmitting at full power, i.e. a measure of the true SINR at full system load.

The SNR or SINR may be translated into an estimated link bit rate via a lookup table or a function. Such functions are as such well known in the literature and a detailed description thereof is therefore omitted. As the skilled person understands, such functions may, for example, be determined from theoretical derivations of e.g., the Shannon capacity or from practical measurements of device performance in controlled lab conditions.

Other embodiments consider the angles of arrival/departure ($\theta$, $\varphi$) in relation to a hypothetical radiation pattern G($\theta$, $\varphi$) and involves deriving an estimate of the antenna gain that the WD 13 will experience.

The determination of whether a particular WD 13 is within service coverage may comprise estimating RSRP, SNR, SINR, and/or bit rate, and comparing the measure with a predetermined threshold. In one example, the SNR could be required to be higher than a threshold of e.g. −6 dB, while in another, the bit rate should exceed a threshold of 1 Mbps.

The fraction of all WDs 13 that would be in service coverage if the candidate beam forming weights are applied may be compared with a predetermined value: if the fraction is larger than this predetermined value, then the cell shaping defined by the set of candidate beam forming weights applied to the corresponding RANNs is, according to an embodiment, considered to provide acceptable service coverage.

Selection of a preferred set of beam forming weights among a larger set of candidate beam forming weights that all fulfil the service coverage criterion may additionally be performed, e.g., by considering which set of beam forming weights that provides the best service coverage in terms of RSRPs, SNRs, SINRs, and/or bit rates.

The spatial channel characteristics may be stored in either a centralized or distributed database.

In a centralized implementation each RANN 11a, 11b, 11c may select a candidate cell shape to be evaluated and reports this to other entities, such as other RANNs 11a, 11b, 11c, in the communications network 10a, 10b. A centralized network node 12 may then determine a set of RANNs 11a, 11b, 11c (one or several) that may try their proposed solution, in such way that the coverage for the whole communications network 10a, 10b is maintained. In other embodiments the centralized network node 12 uses the full database to evaluate a set of cell shaping settings that should be tested in the RANNs 11a, 11b, 11c (for one or multiple simultaneous RANNs 11a, 11b, 11c), and reports this to each RANN 11a, 11b, 11c under consideration.

In a distributed implementation, each RANN 11a, 11b, 11c may keep a list of measurement samples of spatial channel characteristics. Each sample may comprise measurements between one WD 13 and at least one RANN 11a, 11b, 11c. From the list it can be deduced which RANN(s) 11a, 11b, 11c that can provide network coverage for the samples. For the case of simultaneous changes of antenna settings on several RANNs 11a, 11b, 11c, one RANN 11a may query the other RANNs 11b, 11c which weights they intend to use and then check that enough network coverage is provided. For changes that only consider the one RANN 11a the querying becomes obsolete. A token describing which RANN 11a, 11b, 11c is allowed to change the cell shape may be circulated among the RANNs 11a, 11b, 11c.

Combinations of distributed and centralized schemes may be possible, where each RANN 11a, 11b, 11c has partial information of the database in order to determine the antenna settings by means of beam forming parameters for shaping cells, whereas the centralized network node 12 may ensure network coverage for the whole communications network 10a, 10b.

Figure 6:
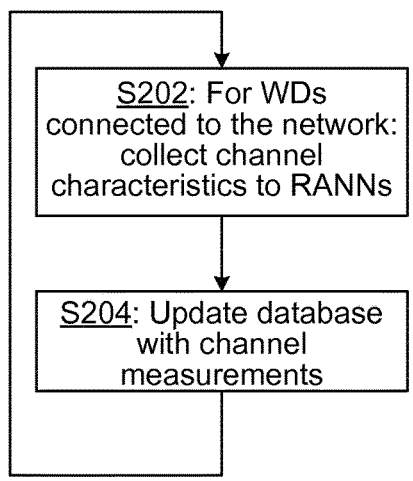

FIG. 6 is a flowchart of a method for handling spatial channel characteristics according to an embodiment.

Step S202: For WDs 13 that have a connection with the communications network 10a, 10b, one or several measurements of the spatial channel characteristics to one or several RANNs 11a, 11b 11c is/are performed. This can be performed in conjunction with initial access to the communications network 10a, 10b and/or periodically during the connection with the communications network 10a, 10b.

Step S204: The measured characteristics are then stored in a database. The database is thus updated.

Each WD 13 has a serving RANN 11a, and the database may be implemented either in a distributed or centralized fashion (see, above). If it is implemented in a distributed fashion, measurements may be stored in the database in the serving RANN 11a where for the case with a centralized database, the measurements may be sent to, and stored in, a central database.

Figure 7:
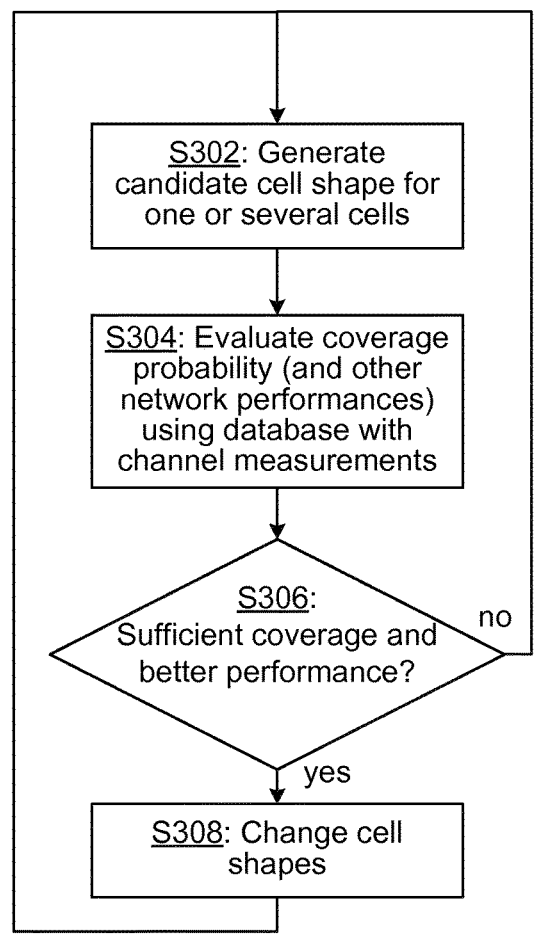

FIG. 7 is a flowchart of a method for cell shaping in wireless communications networks 10a, 10b according to a particular embodiment.

S302: Candidate cell shapes are generated for one or several cells. One way to implement step S302 is to perform step S104.

S304: The network coverage probability (optionally in combination with other network performance criteria) is evaluated by accessing previously stored spatial channel characteristics. One way to implement step S302 is to perform any of steps S104a, S104b, S104c, S104d.

S306: If sufficient network coverage has been found in step S304, step S308 is entered. If sufficient network coverage has not been found in step S304, step S308 is not entered.

S308: Sufficient network coverage has been found and the cell shapes are updated accordingly. One way to implement step S308 is to perform step S106.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although only one WD 13 is illustrated in FIGS. 1a and 1b it is readily understood that the communications network 10a, 10b may comprise a plurality of WDs 13. Further, although only three RANNs 11a, 11b, 11c are illustrated in FIGS. 1a and 1b it is readily understood that the communications network 10a, 10b may comprise a plurality of RANNs 11a, 11b, 11c. The herein disclosed embodiments are not limited to a specific number of WDs or a specific number of RANNs.

The invention claimed is:

1. A method for shaping cells in a wireless communications network, the method being performed by a network node, the method comprising the steps of:
   acquiring previously stored channel characteristics for wireless devices (WDs), the WDs being associated with a set of radio access network nodes (RANNs), the channel characteristics for at least one WD of the WDs being measured between the at least one WD and at least two RANNs in the set of RANNs;
   determining beam forming parameters for shaping cells for at least one RANN in the set of RANNs based on the acquired channel characteristics such that at least a predetermined percentage of the WDs are in service coverage; and
   notifying at least one of the RANNs in the set of RANNs of the determined beam forming parameters.

2. The method of claim 1, wherein
   acquiring previously stored channel characteristics for WDs comprises acquiring a first previously stored channel characteristic for a first WD,
   the first previously stored channel characteristic for the first WD is a channel estimate corresponding to a radio channel between the first WD and each element or element group of an antenna array,
   the first previously stored channel characteristic for the first WD was measured while the first WD was at a first location; and
   the first previously stored channel characteristic for the first WD is associated with stored location information identifying the first location.

3. The method of claim 1, wherein the channel characteristics are channel characteristics of at least some WDs no longer served by any of the RANNs when said channel characteristics are acquired by said network node.

4. The method of claim 1, wherein the channel characteristics relate to at least one of a channel correlation or covariance matrices determined from uplink measurements, and signal strength estimates over multiple antenna elements or beam forms.

5. The method of claim 1, wherein the channel characteristics represent measurements of at least one of sounding reference signals, SRS, and channel state information reference signals, CSI-RS, or are provided as reference signal received power, RSRP, reports.

6. The method of claim 1, wherein
   acquiring previously stored channel characteristics for WDs comprises acquiring a first previously stored channel characteristic for a first WD,
   the first previously stored channel characteristic for the first WD denotes how a signal strength and phase of a channel varies as a function of element position within an antenna array,
   the first previously stored channel characteristic for the first WD was measured while the first WD was at a first location; and
   the first previously stored channel characteristic for the first WD is associated with stored location information identifying the first location.

7. The method of claim 1, wherein
   the channel characteristics are provided in reports from each WD, and
   each report further comprises at least one of a cell identity, a WD identity, and an indication of beam forming parameters for the channel characteristics in the report.

8. The method of claim 7, wherein each report further comprises traffic prioritization information.

9. The method of claim 1, wherein
acquiring previously stored channel characteristics for WDs comprises acquiring a first previously stored channel characteristic for a first WD,
the first previously stored channel characteristic for the first WD comprises at least one of a channel correlation matrix and a channel covariance matrix,
the first previously stored channel characteristic for the first WD was measured while the first WD was at a first location; and
the first previously stored channel characteristic for the first WD is associated with stored location information identifying the first location.

10. The method of claim 1, wherein the beam forming parameters are provided as beam forming weight vectors.

11. The method of claim 1, wherein determining said beam forming parameters comprises:
evaluating a network coverage probability.

12. The method of claim 1, wherein determining said service coverage comprises:
comparing at least one of received power, estimated signal to noise ratio, estimated signal to interference and noise ratio, and estimated bit rate, to respective threshold values.

13. The method of claim 1, wherein determining said beam forming parameters comprises:
determining said service coverage for at least one WD for at least two candidate sets of beam forming parameters; and
determining said beam forming parameters as the candidate set of beam forming parameters having best service coverage.

14. The method of claim 1, wherein the predetermined percentage corresponds to at least 90% of the WDs have network coverage from at least one of the at least two RANNs.

15. The method of claim 1, wherein said network coverage relates to coverage of at least one of a specific service channel and a specific control channel.

16. The method of claim 1, wherein said notifying is based on X2 interface signalling.

17. The method of claim 1, wherein said set of RANNs corresponds to all RANNs of one central network node, such as one radio network controller, RNC.

18. The method of claim 1, wherein
acquiring previously stored channel characteristics for WDs comprises acquiring a first previously stored channel characteristic for a first WD, and
the first previously stored channel characteristic comprises at least one of: direction of arrival estimates and direction of departure estimates.

19. The method of claim 1, wherein determining said beam forming parameters comprises:
requesting at least one of the RANNs to provide its currently used beam forming parameters; and
determining said beam forming parameters based on said currently used beam forming parameters.

20. A network node for shaping cells in a wireless communications network, the network node comprising:
a transmitter;
a receiver;
a memory; and
a processing unit, the processing unit being configured to:
acquire previously stored channel characteristics for wireless devices, WDs, the WDs being associated with a set of radio access network nodes, RANNs, the channel characteristics for at least one WD of the WDs being measured between the at least one WD and at least two RANNs in the set of RANNs;
determine beam forming parameters for shaping cells for at least one RANN in the set of RANNs based on the acquired channel characteristics such that at least a predetermined percentage of the WDs has a network coverage probability being higher than a predetermined threshold value; and
notify at least one of the RANNs in the set of RANNs of the determined beam forming parameters.

21. A computer program product comprising a non-transitory computer readable medium storing a computer program for shaping cells in a wireless communications network, the computer program comprising computer program code which, when run on a processing unit of a network node causes the processing unit to:
acquire previously stored channel characteristics for wireless devices, WDs, the WDs being associated with a set of radio access network nodes, RANNs, the channel characteristics for at least one WD of the WDs being measured between the at least one WD and at least two RANNs in the set of RANNs;
determine beam forming parameters for shaping cells for at least one RANN in the set of RANNs based on the acquired channel characteristics such that at least a predetermined percentage of the WDs has a network coverage probability being higher than a predetermined threshold value; and
notify at least one of the RANNs in the set of RANNs of the determined beam forming parameters.

* * * * *